United States Patent
Huang

(10) Patent No.: US 10,655,781 B2
(45) Date of Patent: May 19, 2020

(54) MOUNTING STRUCTURE FOR PLACING RACK

(71) Applicant: Pei-Hsiu Huang, New Taipei (TW)

(72) Inventor: Pei-Hsiu Huang, New Taipei (TW)

( * ) Notice: Subject to any disclaimer, the term of this patent is extended or adjusted under 35 U.S.C. 154(b) by 0 days.

(21) Appl. No.: 16/195,853

(22) Filed: Nov. 20, 2018

(65) Prior Publication Data

US 2020/0116299 A1 Apr. 16, 2020

(30) Foreign Application Priority Data

Oct. 12, 2018 (TW) .............................. 107136019 A

(51) Int. Cl.
*F16M 13/00* (2006.01)
*F16M 13/02* (2006.01)
*A47G 29/08* (2006.01)

(52) U.S. Cl.
CPC ........... *F16M 13/022* (2013.01); *A47G 29/08* (2013.01); *F16M 2200/024* (2013.01)

(58) Field of Classification Search
CPC .... F16B 7/1418; F16B 2/18; F16B 2200/403; F16B 2/02
USPC ......... 248/219.1, 219.3, 227.3, 230.1, 230.2, 248/230.5, 309.1, 311.2, 311.3
See application file for complete search history.

(56) References Cited

U.S. PATENT DOCUMENTS

| | | | | |
|---|---|---|---|---|
| 4,887,784 A * | 12/1989 | Kayali | ................... | B60N 3/102 248/311.2 |
| 4,984,722 A * | 1/1991 | Moore | ................... | B60N 3/102 224/549 |
| 5,522,527 A * | 6/1996 | Tsai | ......................... | B62J 11/00 224/414 |
| 5,601,268 A * | 2/1997 | Dunchock | .............. | B60N 3/102 224/926 |
| 5,704,232 A * | 1/1998 | Kuo | ......................... | B62J 11/00 248/229.1 |
| 6,663,068 B2 * | 12/2003 | Huang | ............... | A47G 23/0225 224/926 |
| 6,719,254 B1 * | 4/2004 | Speiser | .................... | A47K 1/09 248/311.2 |

\* cited by examiner

*Primary Examiner* — Steven M Marsh
(74) *Attorney, Agent, or Firm* — Leong C. Lei

(57) ABSTRACT

A mounting structure for a placing racket mainly includes a fixing frame including a circular arc seat and an opposite circular arc seat in connection therewith; at least one flexible cushion body is configured between the both seats, and the circular arc seat is formed with a rotatable assembly including a rotatable seat, engagement groove, at least one first joint and an engagement element, where the rotatable assembly is movably connected to a placing seat having an engagement seat and limiting mechanism adapted to be operated in coordination with the rotatable assembly. Whereby, the circular arc seat and opposite circular arc seat can be engaged with each other to fix on a tube, the different number of flexible cushion bodies may be placed to fit different sizes of tubes to facilitate the stable fixation, and the rotatable assembly is used to rotate the placing seat with the limiting mechanism.

5 Claims, 9 Drawing Sheets

MOUNTING STRUCTURE FOR PLACING RACK (a) Technical Field of the Invention

The present invention relates to a mounting structure for a placing racket, and more particularly to a mounting structure for a placing racket capable of being stably fixed and adjusted as one pleases in the orientation of the placing rack so as to allow users to select conveniently the best placing position of the placing racket.

(b) Description of the Prior Arts

In daily life, many mechanisms and utensils may all be connected or fixed to each other by using tubular or strip-shaped objects. For example, it is very inconvenient to place an article such as a mobile phone or drink on a site or object such as a bicycle, wheelchair, stroller, motorcycle rear-view mirror, factory table lamp or connected tube if required. To solve the problem, the fixation thereof is done by using one end of a fixture to clamp it on a tube or column, and connecting another end thereof to a cup holder, or using another fixture to clamp the article.

General tube fixtures are mostly formed by means of elastic elements such as springs operated in coordination with mechanisms to clamp and fix it to the tube. But, because such a kind of fixation way mainly uses the elasticity of the elastic elements to carry out the fixation, the fixation strength always is not sufficient such that carried weight cannot be too heavy.

There is an earlier Taiwan patent filed by the applicant disclosing a clamp using two pieces of arc clips to be locked to each other and fixed to a tube in an inelastic way. But, such a kind of fixation way needs to adjust a direction or angle upon assembly; if the accuracy of the assembly is not sufficient or the direction or angle needs to be changed, the clamp must be detached and reassembled, which is very troublesome in use.

SUMMARY OF THE INVENTION

The main object of the present invention is to provide a mounting structure for a placing racket, using a fixing frame to cooperate with a flexible cushion body to fix the entirety more completely and stably, and allowing users to be convenient to rotate a placing seat as one's will through a rotatable assembly operated in coordination with a limiting mechanism.

To achieve the object mentioned above, the present invention proposes a mounting structure for a placing racket, including: a fixing frame, including a circular arc seat and an opposite circular arc seat configured at one side of the circular arc seat, the circular arc seat being a C-shaped body, two sides of the circular arc seat respectively configured with a groove and a nut embedded in the groove, the opposite circular arc seat is an anti-C-shaped body, two sides of the opposite circular arc seat are respectively configured with a through hole corresponding to the groove, and the circular arc seat in combination with the opposite circular arc seat by passing a screw through each through hole and corresponding groove to engage with the nut; at least one flexible cushion body, put around a tube to allow the fixing frame to be assembled on the flexible cushion body, and the flexible cushion body having at least one fitting surface; a rotatable assembly, including a rotatable seat, an engagement groove, at least one first joint and an engagement element, the rotatable seat in combination with the circular arc seat, the engagement groove formed on the rotatable seat, the first joint defined on the engagement groove, and the engagement element movably configured inside the engagement groove; a placing seat, in movable connection with the rotatable assembly and positioned on one side thereof away from the fixing frame, allowing an orientation of the placing seat to be changed through the rotatable assembly; an engagement seat, formed on the placing seat, cooperating with the engagement element to rotate in conjunction with the rotatable seat; at least one second joint, defined on the engagement seat, and the second joint adapted to be in corresponding connection with the first joint, and a limiting mechanism, configured on one side of the engagement seat, and including a pressing element and elastic element, the pressing element projected from the placing seat and adapted to push the engagement element to move, and the elastic element configure inside the engagement groove and adapted to provide the engagement element with a reciprocating elastic force.

With the above structure, users can engage the circular arc seat with opposite circular arc seat on a tube with the flexible cushion body or bodies and adjust the number of the flexible cushion bodies according to the size of the tube; more sheets of flexible cushion bodies are needed if the tube is thinner. Furthermore, a screw is used to be in engagement with the nut inside the circular arc seat, thereby fixing the circular arc seat and opposite circular arc seat to each other on the tube; such a kind of fixing way can strengthen fixing stability with the flexible cushion bodies so that they will be more stable after fixed. Furthermore, the rotatable assembly is operated in coordination with the limiting mechanism, thereby rotating the placing seat. In this way, the placing seat can still be rotated for the orientation adjustment thereof even after the placing seat is fixed to the tube by the fixing frame, thereby increasing use convenience.

With the above technology, the present invention can break through the problems of the conventional tube clamp fixing being less stable and more troublesome in adjustment.

DETAILED DESCRIPTION OF THE PREFERRED EMBODIMENTS

Figure 1:
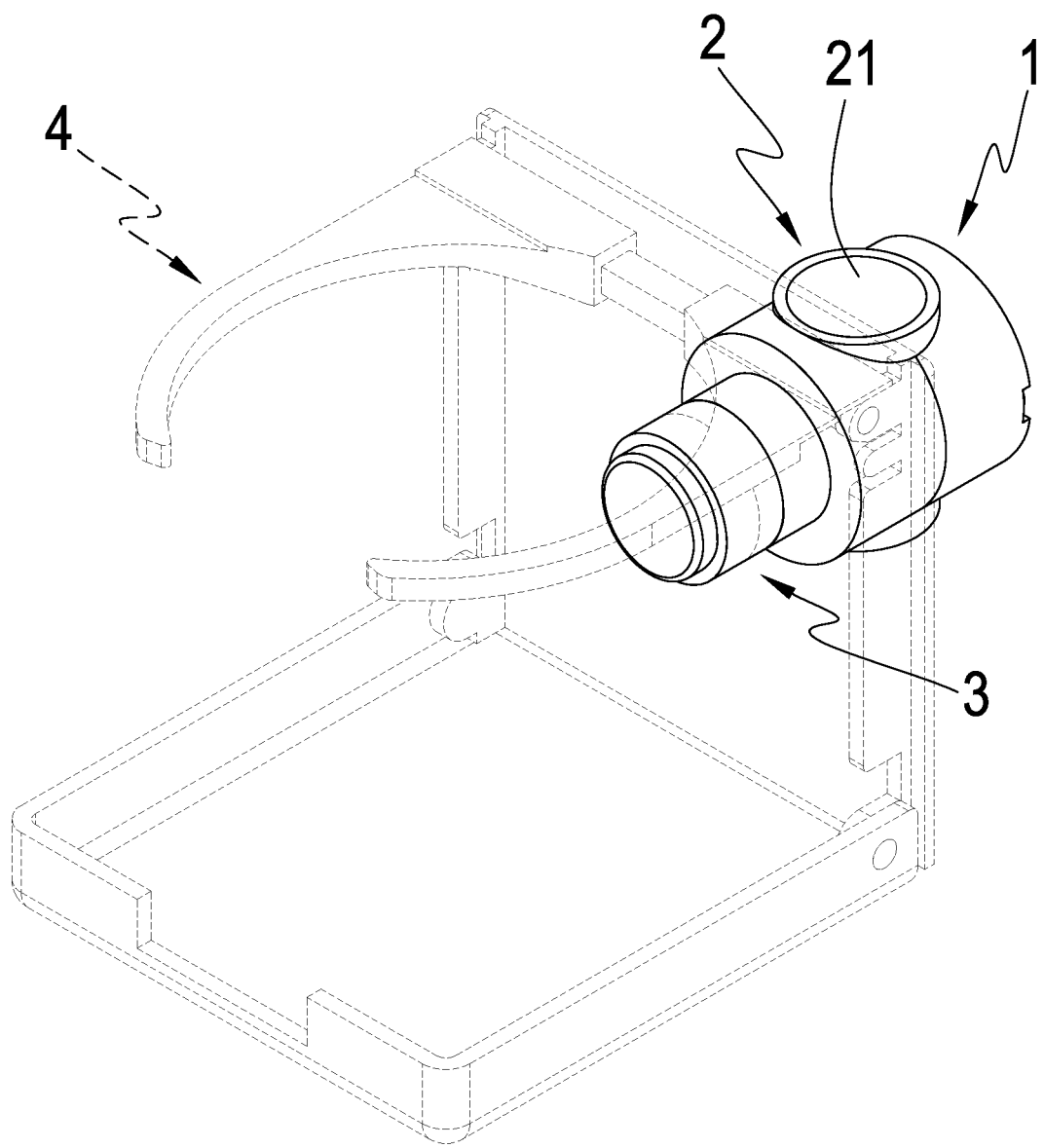
FIG. 1 is a perspective view of a preferred embodiment of the present invention.
Figure 2:
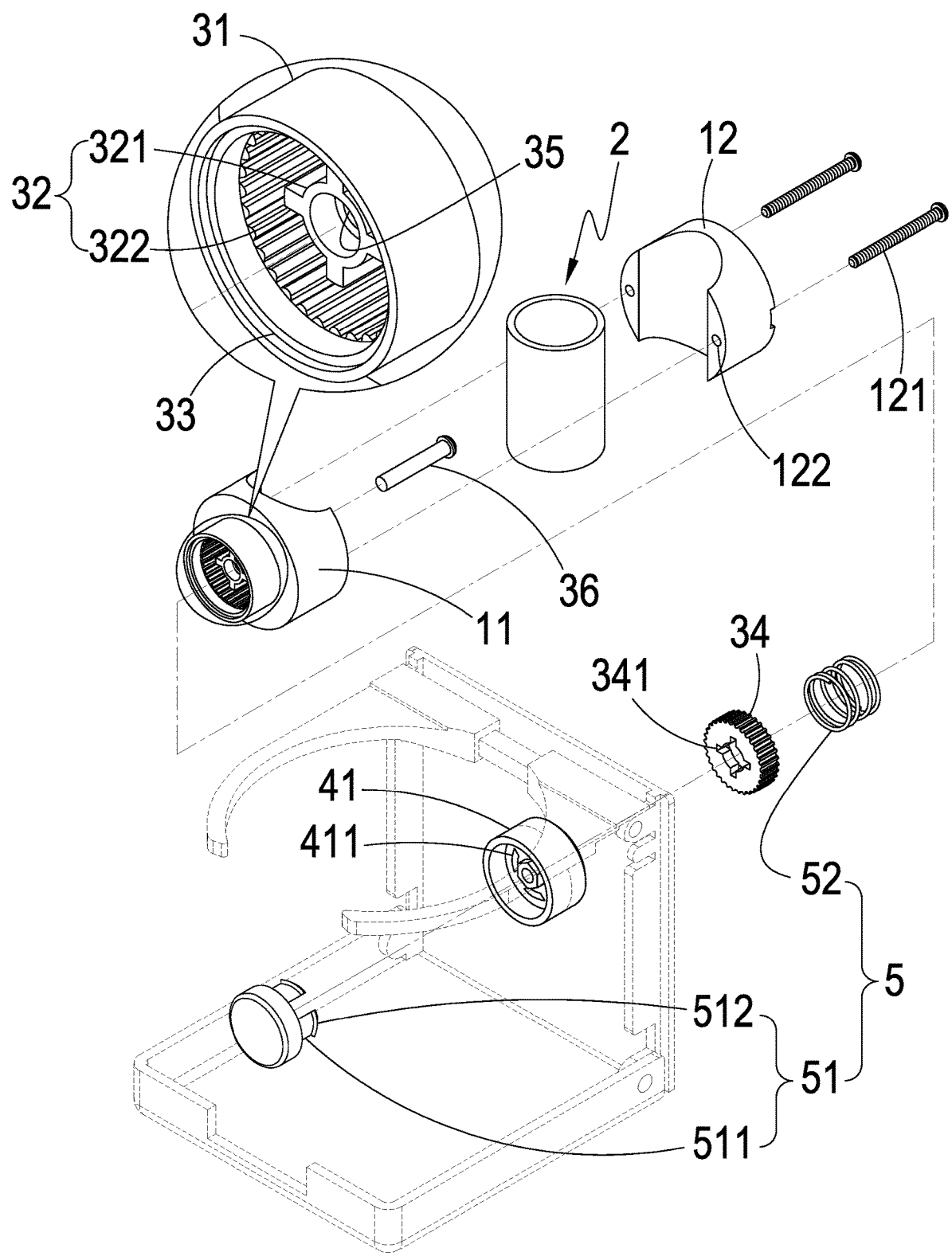
FIGS. 2 and 3 respectively are an exploded view of the embodiment of the present invention.
Figure 3:
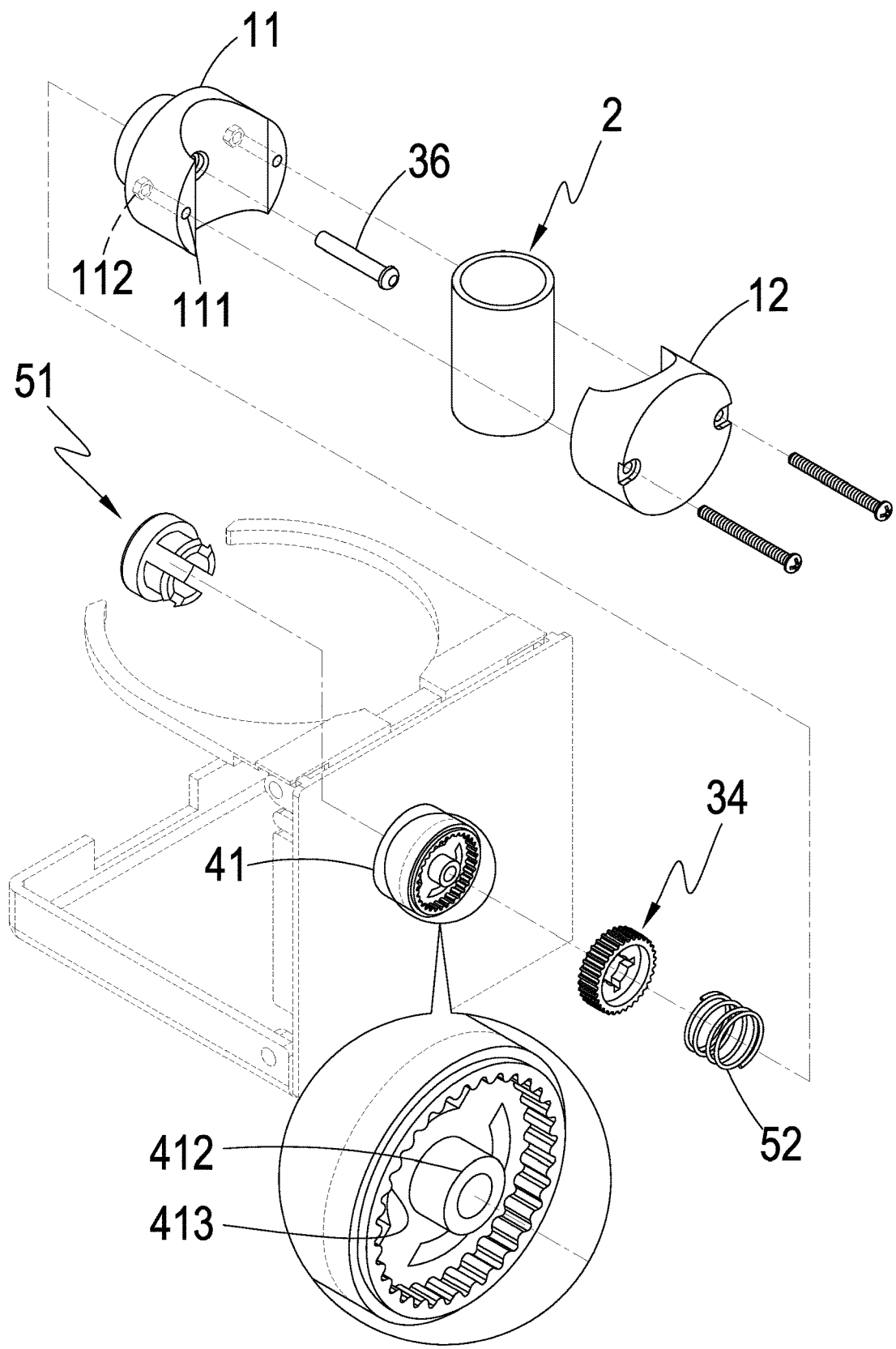
Figure 4:
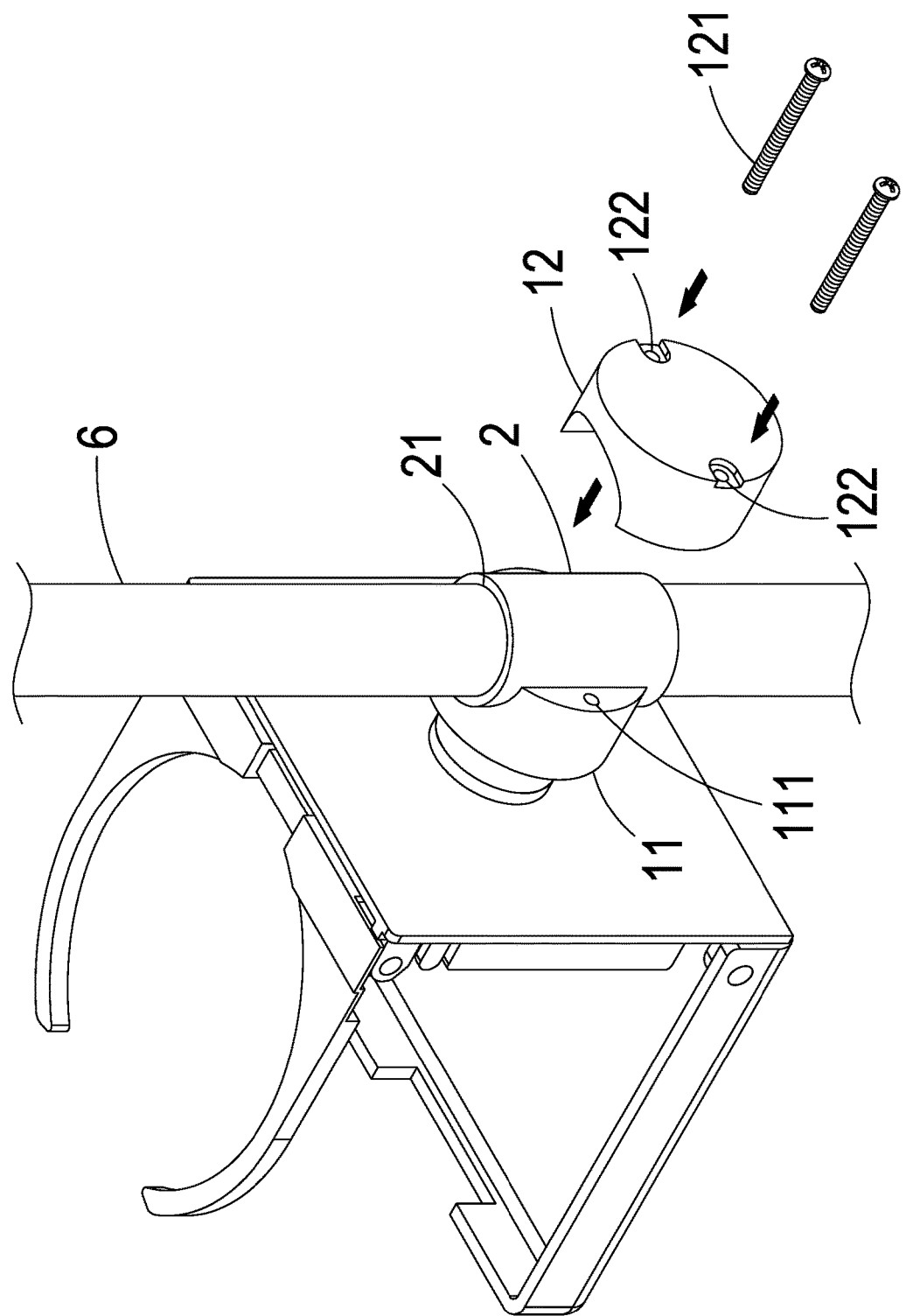
FIG. 4 shows the embodiment of the present invention upon assembly.
Figure 5:
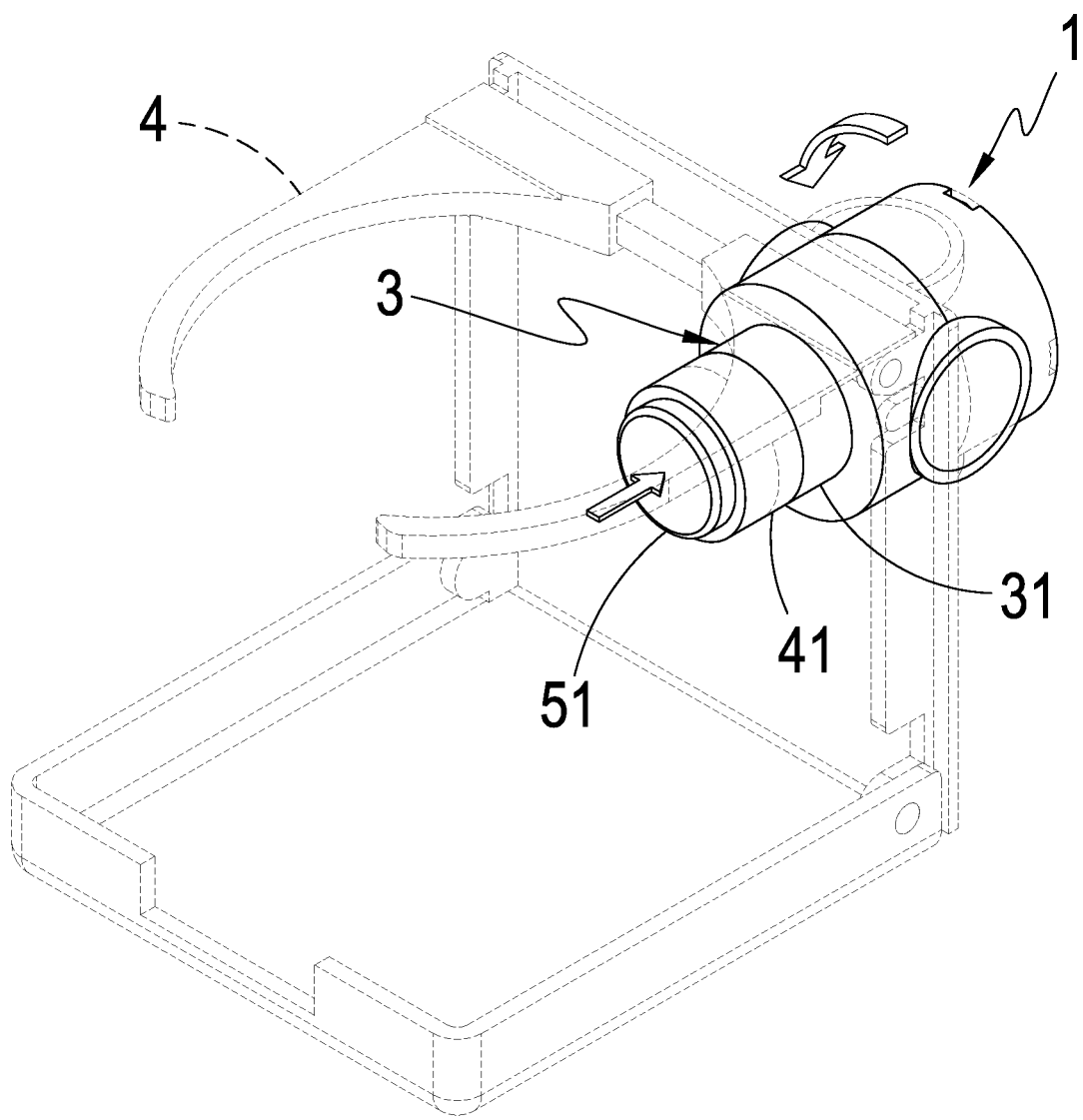
FIGS. 5, 6 and 7 respectively show the embodiment of the present invention upon rotation.
Figure 6:
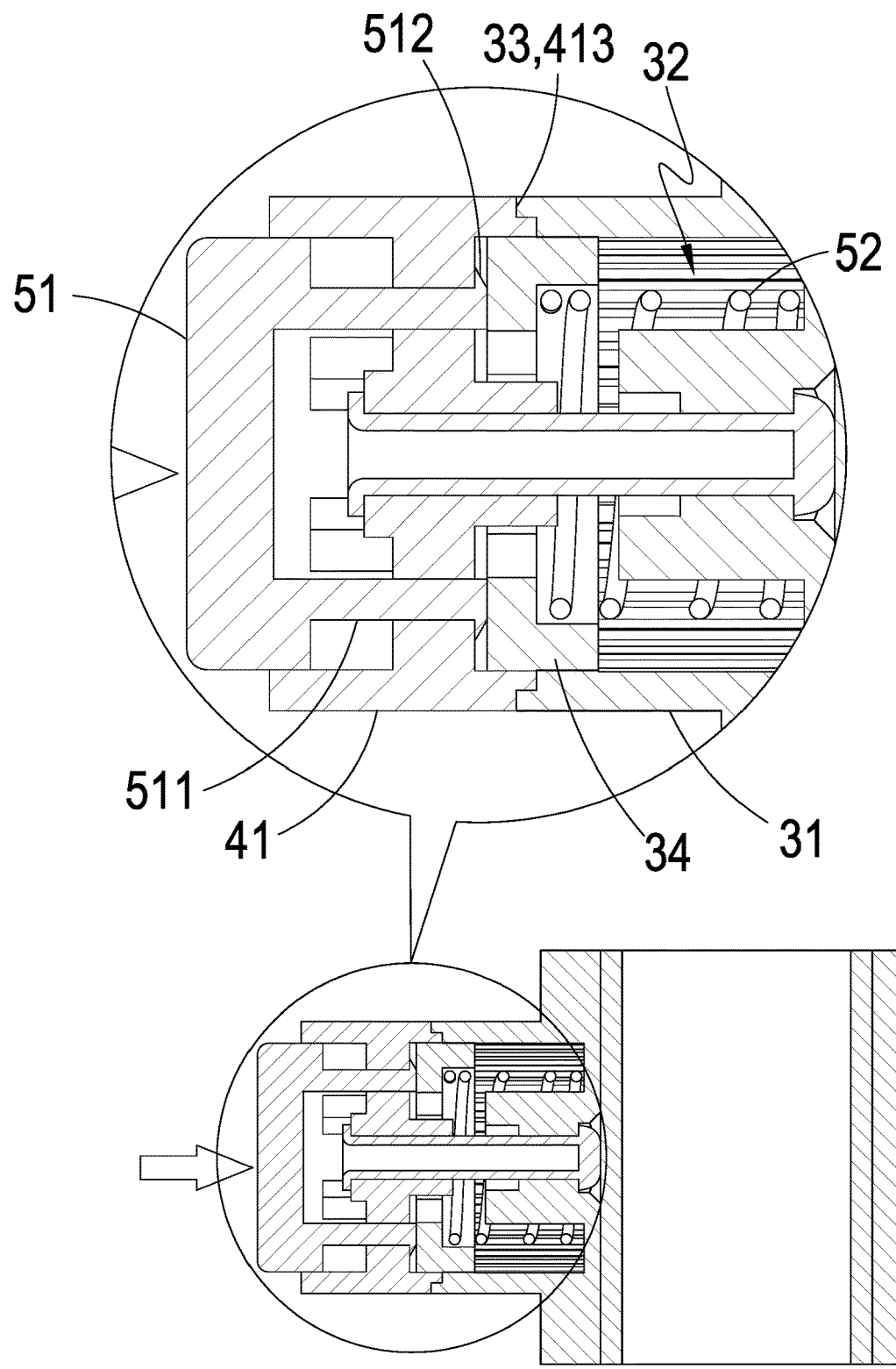
Figure 7:
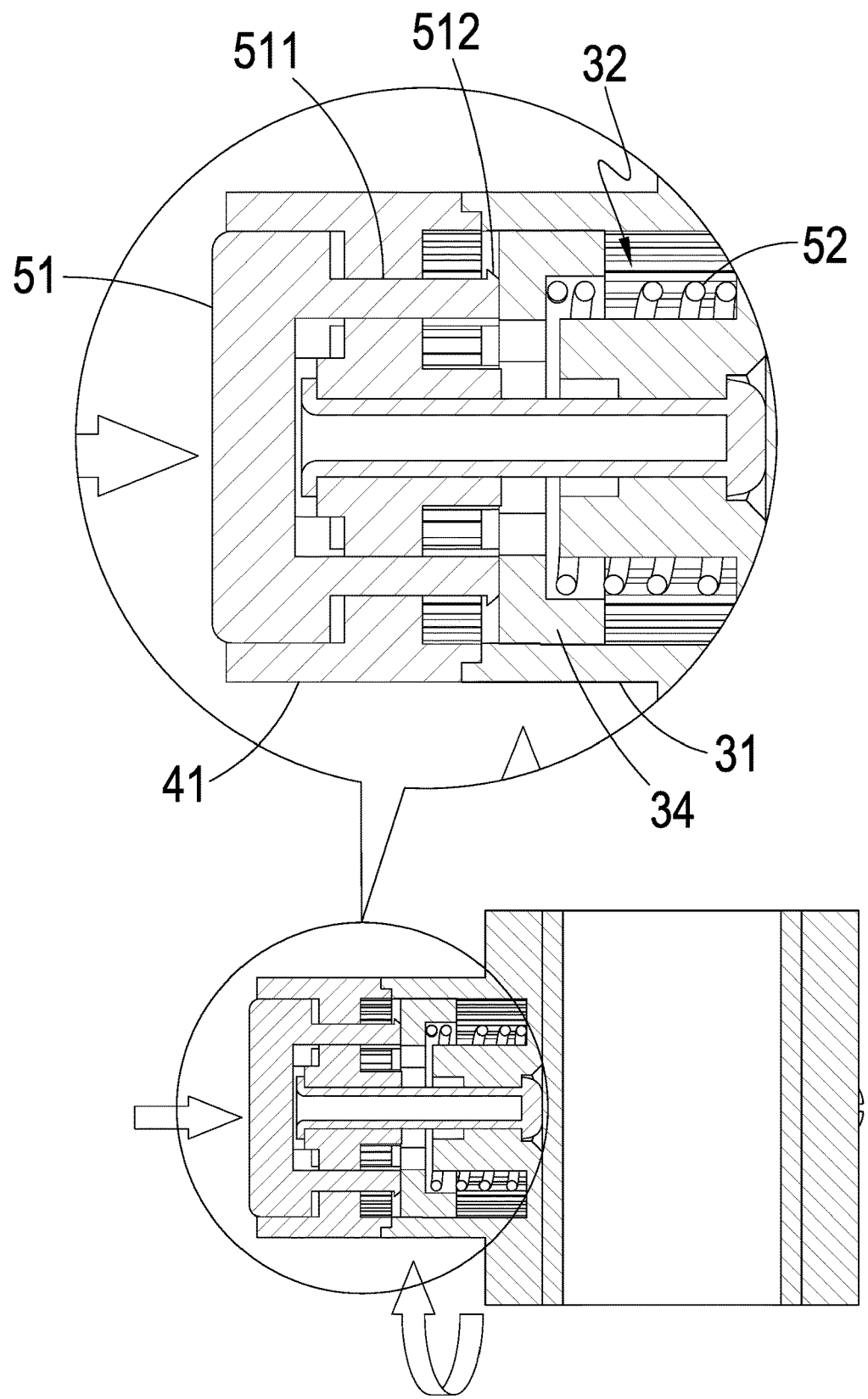

Referring to FIGS. 1 to 4, a mounting structure for a placing racket of the present invention includes a fixing frame 1, at least one flexible cushion body 2, a rotatable assembly 3, a placing seat 4, an engagement seat 41, at least one second joint 413, a limiting mechanism 5, and a limiting column 321.

The fixing frame 1 includes a circular arc seat 11 and opposite circular arc seat 12, where the circular arc seat 11 is a C-shaped seat and the opposite circular arc seat 12 is an anti-C shaped seat. Furthermore, the two sides of the circular arc seat 11 are respectively configured with a groove 111 embedded with a nut 112, and the two sides of the opposite circular arc seat 12 are respectively configured with a through hole 122 corresponding to the groove 111 and allowing a screw 121 to be passed through and engaged with the nut 112, thereby fixing the circular arc seat 11 and opposite circular arc to each other.

The at least one flexible cushion body 2 is configured between the circular arc seat 11 and opposite circular arc seat 12 and put around and attached to a tube 6. Furthermore, the circular arc seat 11 and opposite circular arc seat 12 are used to clamp the cushion body 2 in-between, and the flexible cushion body 2 is configured with at least one fitting surface 21.

The rotatable assembly 3 is configured on the fixing frame 1 and includes a rotatable seat 31, an engagement groove 32, at least one first joint 33, an engagement element 34 and a bolt hole 35, where the rotatable seat 31 is extended from one side of the circular arc seat 11 and may not be integrated with the circular arc seat 11. In an embodiment, the rotatable assembly 31 being integrated with the circular arc seat 11 is exemplified. The engagement groove 32 is formed on the rotatable seat 31. The first joint 33 is defined on the engagement groove 32. The engagement element 34 is movably configured in the engagement groove 32. The first bolt hole 35 is formed on the center of the rotatable seat 31 and extended up to the circular arc seat 11.

The placing seat 4 is in movable connection with one side of the rotatable assembly 3 away from the fixing frame 1, allowing the orientation of the placing seat 4 to be changed through the rotatable assembly 3.

The engagement seat 41 is formed on the placing seat 4 and can be rotated with rotatable seat 31 with the engagement element 34, and the engagement seat 41 is further formed with at least a limiting hole 41 and a second bolt hole 412 corresponding to the first bolt hole 35.

The at least one second joint 413 is defined on the engagement seat 41 and in corresponding engagement with the first joint 33.

The at least one limiting mechanism 5 is configured on one side of the engagement seat 41 and includes a pressing element 51 and an elastic element 52 configured inside the engagement groove 32, where the pressing element 51 is projected from the placing seat 4 and adapted to push the engagement element 34 to move; the pressing element 51 includes at least one fixing portion 511 adapted to insert in the limiting hole 411 and a barb portion 512 formed on the fixing portion 511 adapted to press against the engagement seat 41, and the elastic element 52 provides the engagement element 34 with reciprocating elastic force.

In the embodiment, a limiting column 321 allowing the elastic element 32 to be put around it is formed inside the engagement groove 32. Furthermore, one side of the limiting column 321 is formed with at least one limiting convex portion 322, and limiting concave portions 341 in corresponding engagement with the limiting column 321 and a limiting convex portion 322 is formed on the engagement element 34; the rotatable assembly 3 further includes a rivet 36 passed correspondingly through the first bolt hole 35 and second bolt hole 412, thereby fixing the circular arc seat 11 and placing seat 4 together.

Referring to FIGS. 1 to 7, a user may first put the flexible cushion body 2 around the tube 6 upon the assembly of the mounting structure of the present invention and use the fitting surface 21 to stick on the tube 6 so as to be convenient to engage the circular arc seat 11 with the opposite circular arc asset 12 on the flexible cushion body 2 to strengthen the whole skid-proof effect. Thereafter, a screw 121 is passed through the through hole 122 and locked to the nut 112 inside the groove 111, and the circular arc seat 11 and opposite circular arc seat 12 can then be engaged with each other on the tube 6. In addition, a user can further change the number of the flexible cushion bodies 2 conveniently and quickly according to the size of the tube 6. The above-mentioned earlier patent filed by the applicant has already disclosed the way of using the flexible cushion bodies 2 to increase the skid-proof effect, but it uses thin and thick flexible cushion bodies 2 alternatively, but there are also inadequacies compared to the present invention. For example, the patent discloses that a thin flexible cushion body 2 is used for a tube of one inch diameter, a thick flexible cushion body 2 a tube of ⅞ inches diameter, and one thin and one thick flexible cushion bodies 2 are simultaneously used for a tube of ⅝ inches diameter; when the thick and thick cushion bodies 2 are used, a user will feel a little inconvenient because the thick one is relatively difficult to be put around the tube. Therefore, the flexible cushion body 2 of the same thickness are used according to the present invention; one sheet of flexible cushion body 2 is used for a tube of one inch diameter, two sheets of flexible cushion bodies 2 are used for a tube of ⅞ inches diameter, three sheets thereof a tube of ⅝ inches diameter, four sheets thereof a tube of ⅝ inches diameter, and so on, and the number of the flexible cushion bodies 2 can then be changed according to the size of the tube 6, thereby allowing the fixation of the fixing frame 1 to be more stable. Among these, the present invention capable of being mounted on a round tube of ⅝ inches diameter is a big breakthrough because lightweight strollers mostly use round tubes of ⅝ inches diameter so that the use range of the present invention can be substantially increased.

Furthermore, the rotatable assembly 3 will be rotated through the alignment setting of the engagement groove 32 of the rotatable seat 31 and the engagement seat 41 of the placing seat 4, thereby moving the rotatable seat 31 and engagement seat 41 by movably configuring the engagement element 34 inside the engagement groove 32 so as to provide the free rotation of 360 degrees. Furthermore, the limiting column 32 inside the engagement groove 32 not only allows the elastic element 52 to be put around it simply but can be used as a fixed sliding track for the elastic element 52 and engagement element 34 by correspondingly combining the limiting convex portions 322 of the limiting column 321 with the limiting concave portions 341 of the engagement element 34, allowing the elastic element 52 and engagement element 34 not to be derailed due to the squeeze of the pressing element 51 and allowing the engagement seat 41 not to be decreased in rotation sensitivity and not to even be stuck (the limiting convex portion 322 forming a cross-shaped pattern is exemplified in the embodiment), further achieving the effects of facilitating rotation, avoiding the excessive wear of the engagement seat 41 and engagement element 34. In addition, the combination of the rotatable assembly 3 and circular arc seat 11 with the placing seat 4 is completed by passing a rivet 36 through the first bolt hole 35 of the rotatable seat 31 and circular arc seat 11, elastic element 52, and the second bolt hole 412 of the engagement element 34 and engagement seat 41, and fixing it to the placing seat 4 by expanding the end of the rivet 36 by means of a rivet machine.

Although the way of locking fixation through the circular arc seat 11 and opposite circular arc seat 12 have been disclosed in the earlier patents filed by the applicant, such a fixation way is not easy to adjust the orientation of the pacing seat 4. In the embodiment, a user can carry out the orientation locking to the placing seat 4, and the operation thereof is very simple and convenient; the user only needs to press down the pressing element 5, and the rotatable seat 31 and placing seat 4 can then be rotated relatively, which is very convenient.

Furthermore, the corresponding action of the internal structure is described as the following: the fixing portion 51 is passed out of the engagement seat 41 through the limiting hole 41 when the pressing element 51 is pressed down to push the engagement element 34 and elastic element 52 to move to separate the engagement element 34 from the engagement seat 41 and accept it in the engagement groove 32 temporarily. At his time, the placing seat 4 can then move the engagement seat 41 to rotate relatively with the rotatable seat 31, and the upper edge of the engagement groove 32 and the lower edge of the engagement seat 41 are simultaneously limited in position with the corresponding combination of the first joint 33 with the second joint 413, allowing the engagement groove 32 of the rotatable seat 31 and the engagement seat 41 to be more stable. Furthermore, when the user releases the pressing element 51, the engagement element 34 is pushed back reversely by the elastic force of the elastic element 52, allowing the engagement element 34 to be engaged between the engagement groove 32 and engagement seat 41 again. Because the resetting of the engagement element 34 simultaneously pushes the pressing element 51 reversely, the pressing element 41 is allowed to be ejected again. However, the barb portion 512 on the fixing portion 511 can hook up the bottom face of the engagement seat 41 to limit the pressing element 51 to one side of the engagement seat 41.

Figure 8:
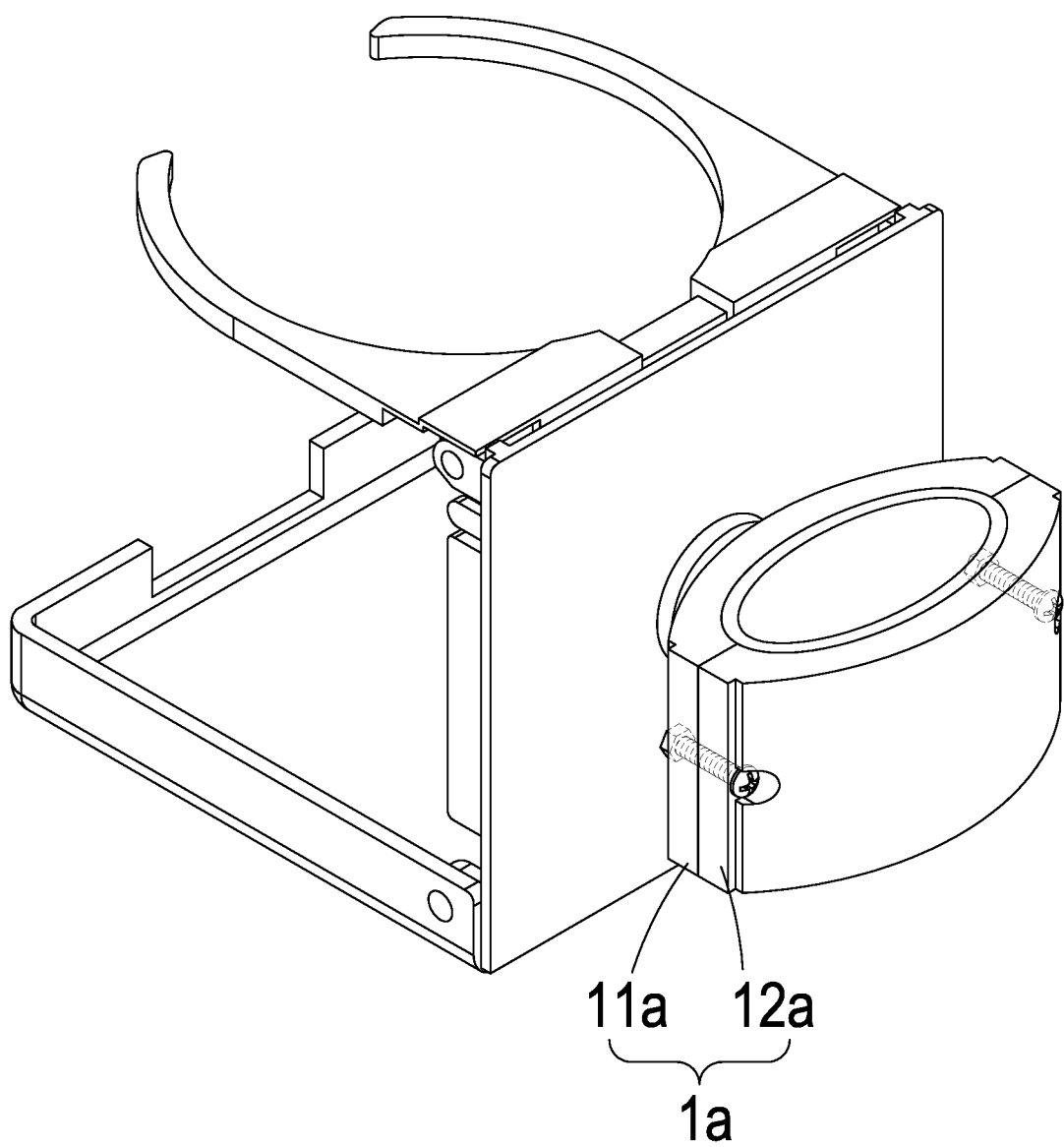
FIG. 8 is a perspective view of another preferred embodiment of the present invention.
Figure 9:
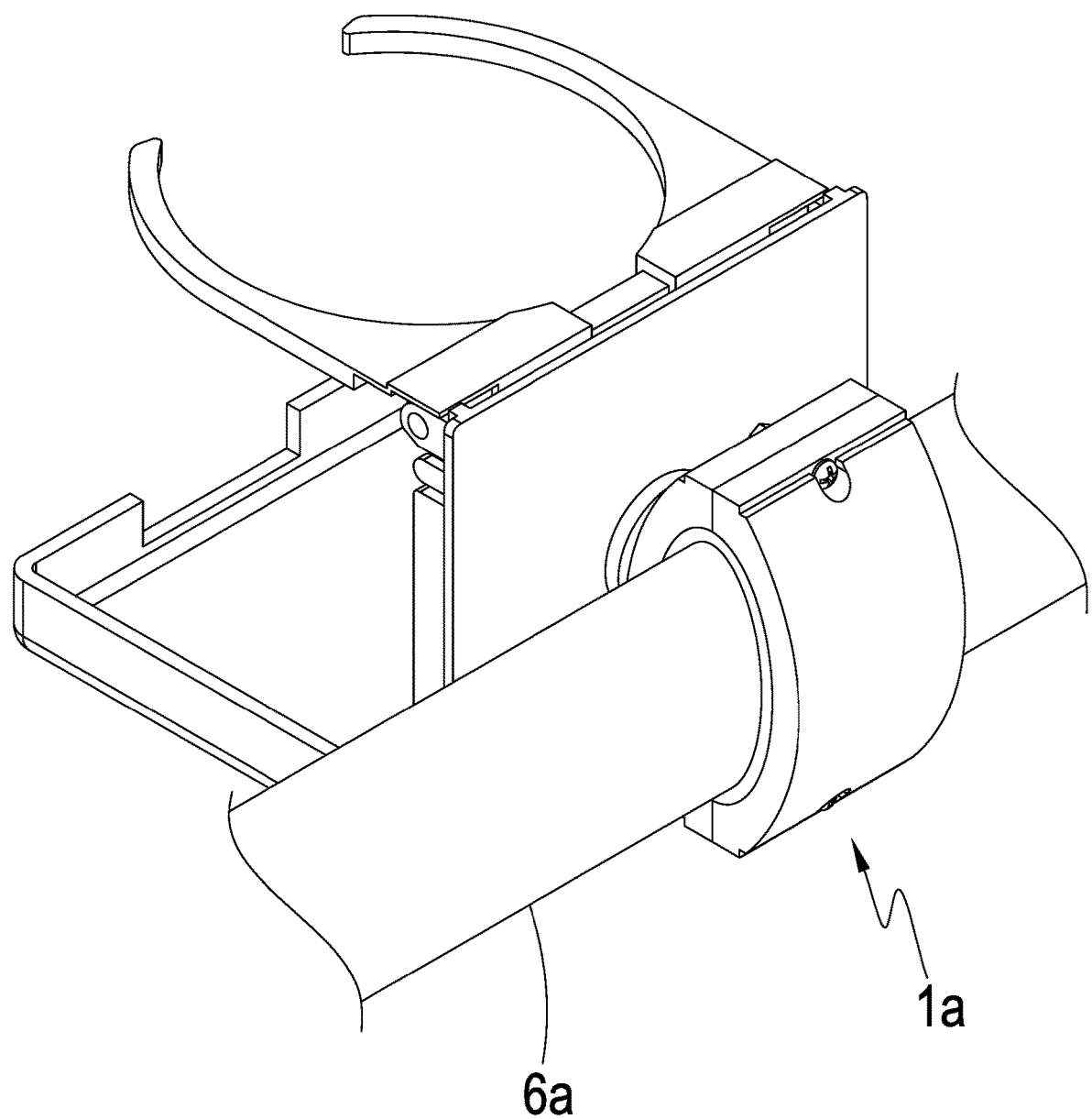
FIG. 9 shows another embodiment of the present invention upon assembly.

Referring to FIGS. 8 and 9, which show another preferred embodiment of the present invention of the present invention, the difference between the present embodiment and the above embodiment is in that a circular arc seat 11 a and opposite circular arc seat 12a, in the present embodiment, are formed into an elliptical body after combined with each other, thereby indicating that the shape of the fixing frame 1a is not limited and it can be made according to a different tube 6a.

Therefore, the present invention has the following advantages over the prior arts:

1. allowing the entirety to be more stable through the fixing frame 1 with the flexible cushion body 2 when fixed to the tube 6, and increasing or reducing the number of the flexible cushion bodies 2 according the size of the tube 6 so as to increase a use range; and
2. enabling the orientation of the placing seat 4 to be changed after fixed to the tube 6 by operating the rotatable assembly 3 in coordination with the limiting mechanism 5, allowing a user to be more convenient to operate the entire structure.

I claim:

1. A mounting structure for a placing racket, comprising:
   a fixing frame, comprising a circular arc seat and an opposite circular arc seat configured at one side of said circular arc seat, said circular arc seat being a C-shaped body, two sides of said circular arc seat respectively configured with a groove and a nut embedded in said groove, said opposite circular arc seat is an anti-C-shaped body, two sides of said opposite circular arc seat are respectively configured with a through hole corresponding to said groove, and said circular arc seat in combination with said opposite circular arc seat by passing a screw through each said through hole and corresponding groove to engage with said nut;
   at least one flexible cushion body, put around a tube to allow said fixing frame to be assembled on said flexible cushion body, and said flexible cushion body having at least one fitting surface;
   a rotatable assembly, comprising a rotatable seat, an engagement groove, at least one first joint and an engagement element, said rotatable seat in combination with said circular arc seat, said engagement groove formed on said rotatable seat, said first joint defined on said engagement groove, and said engagement element movably configured inside said engagement groove;
   a placing seat, in movable connection with said rotatable assembly and positioned on one side thereof away from said fixing frame, allowing an orientation of said placing seat to be changed through said rotatable assembly;
   an engagement seat, formed on said placing seat, cooperating with said engagement element to rotate in conjunction with said rotatable seat;
   at least one second joint, defined on said engagement seat, and said second joint adapted to be in corresponding connection with said first joint, and a limiting mechanism, configured on one side of said engagement seat, and comprising a pressing element and elastic element, said pressing element projected from said placing seat and adapted to push said engagement element to move, and said elastic element configure inside said engagement groove and adapted to provide said engagement element with a reciprocating elastic force.

2. The structure according to claim 1, wherein said engagement seat is formed with at least one limiting hole, said pressing element comprises at least one fixing portion and barb portion, said fixing portion is adapted to insert in said limiting hole, and said barb portion is formed on said fixing portion and adapted to prop against said engagement seat.

3. The structure according to claim 1, wherein a limiting column allowing said elastic element to be put therearound is formed inside said engagement groove, one side of said limiting column is formed with a limiting convex portion, and said engagement element is formed with a concave portion in corresponding combination with said limiting column and limiting convex portion.

4. The structure according to claim 3, wherein said rotatable assembly further comprising a rivet passed through said limiting column and engagement element and adapted to rivet said rotatable seat, engagement seat and circular arc seat together.

5. The structure according to claim 4, wherein a center of said rotatable seat has a second bolt hole corresponding to said first bolt hole, and said rivet is allowed to be passed through said first and second bolt holes.

* * * * *